United States Patent
Kinugasa et al.

(10) Patent No.: US 7,022,367 B2
(45) Date of Patent: Apr. 4, 2006

(54) OOLONG TEA BEVERAGE AND PROCESS OF PRODUCING THE SAME

(75) Inventors: Hitoshi Kinugasa, Shizuoka (JP); Kazunori Okanoya, Shizuoka (JP); Izumi Awano, Shizuoka (JP); Motomu Takamatsu, Shizuoka (JP)

(73) Assignee: Ito En, Ltd., Tokyo (JP)

( * ) Notice: Subject to any disclaimer, the term of this patent is extended or adjusted under 35 U.S.C. 154(b) by 0 days.

(21) Appl. No.: 10/900,373

(22) Filed: Jul. 28, 2004

(65) Prior Publication Data

US 2006/0024421 A1  Feb. 2, 2006

(51) Int. Cl.
*A23F 3/00* (2006.01)
*A23F 3/16* (2006.01)

(52) U.S. Cl. ............... 426/597; 426/442; 426/427; 426/435

(58) Field of Classification Search ............... 426/597, 426/442, 427, 435
See application file for complete search history.

(56) References Cited

U.S. PATENT DOCUMENTS 4,004,038 A * 1/1977 Wickremasinghe ......... 426/422
4,315,036 A * 2/1982 Husaini et al. ............. 426/387
5,780,086 A * 7/1998 Kirksey et al. ............ 426/330.3

FOREIGN PATENT DOCUMENTS

| JP | 05-236876 A | 9/1993 |
| JP | 11-113491 A | 4/1999 |
| JP | 11-289983 A | 10/1999 |

OTHER PUBLICATIONS

Translation for JP 11-113491. Generated through Japanese Patent Office website <URL: http://www19.ipdl.ncipi.go.jp/PA1/cgi-bin/PA1INDEX>.*
Michiko Kawakami, "Topics and Progress in Tea Flavor Science, Tea Aroma Studies Its Proceedings and Latest Data", Department of Food Services, Ibaraki Christian University, Oomika-machi, 6-11-1, Hitachi, Ibaraki 319-1295, Japan, Foods Food Ingredients J. Jpn. No. 197 (2002).

* cited by examiner

*Primary Examiner*—Anthony Weier
(74) *Attorney, Agent, or Firm*—Sughrue Mion, PLLC

(57) ABSTRACT

The oolong tea beverage is produced by a cold water treatment step of bringing raw material oolong tea leaves into contact with water adjusted at pH about 4 to 6 and 25° C. or lower, eluting and removing about 11 to 26% caffeine from the raw material oolong tea leaves by carrying out solid-liquid separation, and recovering the treated tea leaves; and a hot water extraction step of recovering hot water extract to be a beverage raw material containing nerolidol by extracting the treated tea leaves with hot water at about 90 to 95° C. containing vitamin C and adjusted at pH about 4 to 6 and then carrying out solid-liquid separation. The cold water treatment step enables eluting and removing caffeine and the hot water extraction step enables extracting more nerolidol, which is a flow scent component particular in high quality oolong teas.

12 Claims, 1 Drawing Sheet

Comparison of aroma components in each extraction

Ratio to the result taken as 1 of Comparative Example 1

■ Comparative Example 1   □ Example 1   ▨ Comparative Example 2

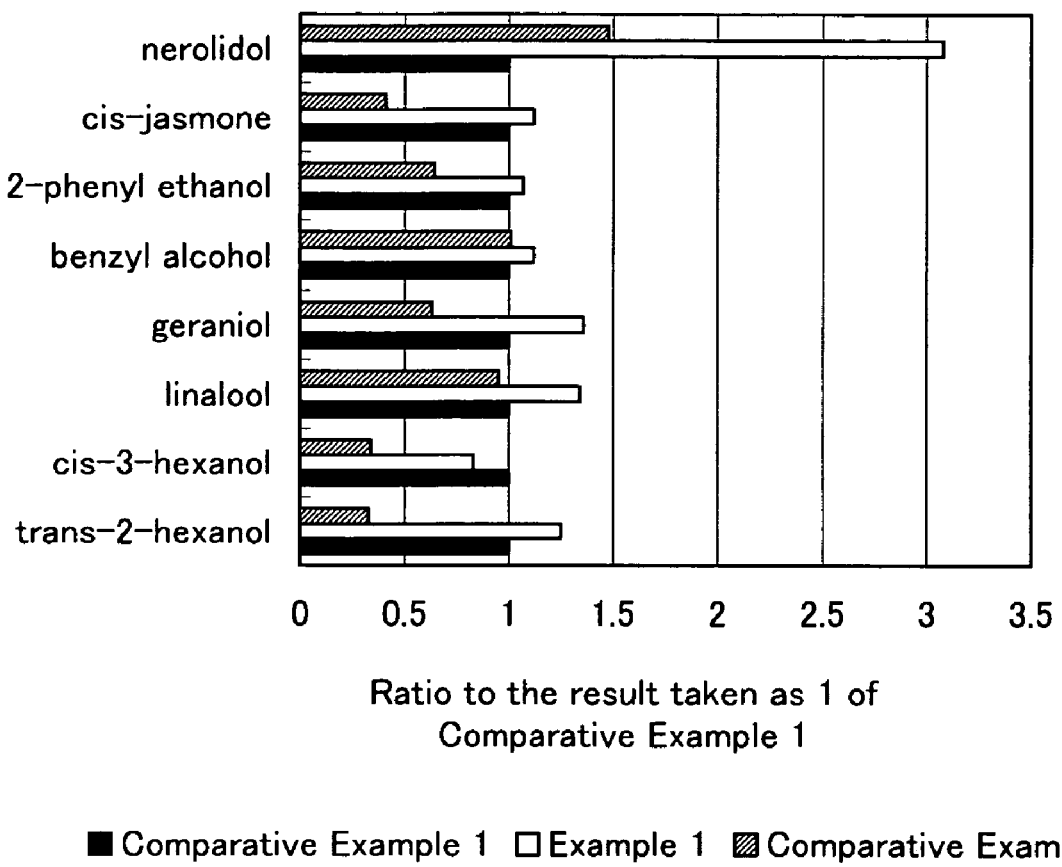

OOLONG TEA BEVERAGE AND PROCESS OF PRODUCING THE SAME

BACKGROUND OF THE INVENTION

1. Field of the Invention

The invention relates to an oolong tea beverage (a drink) filled in containers such as cans, paper drink boxes, and plastic bottles and sold and a process of producing the same. Particularly, the invention relates to an oolong tea beverage produced by especially strongly extracting a particular scent of oolong tea with high quality and a process of producing the same.

2. Related Art Statement

Tea can broadly be classified into three types; green tea (unfermented tea), black tea (fermented tea), and oolong tea (semi-fermented tea). They are all derived from tea tree (scientific name: *Camellia sinensis*) belonging to Camellia genus, Camellia family and depending on the processing method for tea leaves, mainly the difference of fermentation extents, teas with totally different color, flavor, and taste are produced.

Oolong tea is a semi-fermented tea produced by stopping the oxidative fermentation of tea leaves in the middle of the process. The raw material tea leaves of the oolong beverage (a drink) are generally produced by sun-drying picked-up tea leaves or drying them in the shade, oxidizing and fermenting the dried leaves in the insides of bamboo baskets, stopping the fermentation by roasting the leaves when the oxidation fermentation are promoted to 30% to 70% extent, and rubbing and hot air-drying the obtained leaves.

One of particular characteristics of oolong tea is deep and rich flower smell (flower scent). It is said that the flow scent is derived from terpene type alcohols such as linalool, geraniol, and nerolidol, and aroma components such as jasmine lactone, methyl jasmonate, cis-jasmone, and indole.

Conventionally proposed processes of producing oolong tea will be exemplified as follows.

Japanese Patent Application Laid-Open No. 5-236876 discloses a process of producing concentrated oolong tea by putting oolong tea leaves in a hot water containing at least one of ascorbic acid, cyclodextrin and starch, boiling the water for extracting the oolong tea components, filtering the extract by a filter such as a filtration cloth, a filtration paper, or a cartridge for removing sediment, and separating and recovering a concentrated liquid from the filtered extract by reverse osmosis.

Japanese Patent Application Laid-Open No. 11-289983 discloses a process of producing canned oolong tea, comprising: a first sterilization step of sterilizing oolong tea extract by instantaneous sterilization at ultrahigh temperature; and a second sterilization step of keeping the extract at 90° C. or higher for about 20 seconds after pouring the extract in a can and turning the can upside down, and then keeping the resulting extract at 85° C. or higher for 4 to 5 minutes.

Japanese Patent Application Laid-Open No. 11-113491 discloses a process of producing a tea type beverage by removing a cold water-extracted solution obtained by extracting teas with cold water at 20° C. or lower and re-extracting the tea residues with hot water at 30 to 95° C.

SUMMARY OF THE INVENTION

A process of producing an oolong tea beverage which the invention proposes comprises a cold water treatment step of bringing raw material oolong tea leaves into contact with water adjusted at pH about 4 to 6 and 25° C. or lower for about 30 seconds or longer and shorter than 3 minutes, eluting and removing about 11 to 26% caffeine from the raw material oolong tea leaves by carrying out solid-liquid separation, and recovering the treated tea leaves; and a hot water extraction step of recovering hot water extract to be a beverage raw material containing nerolidol by extracting the treated tea leaves for about 10 minutes or longer and 15 minutes or shorter with hot water at about 90 to 95° C. containing vitamin C and adjusted at pH about 4 to 6 and then carrying out solid-liquid separation.

An oolong tea beverage which the invention proposes is obtained by using the hot water extract obtained by the above-mentioned production process of the invention as the beverage raw material and is characterized in that the oolong tea beverage contains more nerolidol than that in a common beverage.

Nerolidol is a characteristic flower scent component contained in high quality oolong teas classified in the first grade in China, for example, the cultivar "tie guan yin" and the cultivar "huang jin gui".

In the invention, "the raw material oolong tea leaves" mean tea leaves to be used as a raw material for the oolong tea beverage, that is, tea leaves subjected for rough tea processing for oolong tea leaves. Water to be used for "the cold water treatment step" is called as cold water since it is at a lower temperature than that of hot water. "Vitamin C" includes ascorbic acid and sodium ascorbate.

In the invention, "the process of producing an oolong tea beverage, comprising a predetermined cold water treatment step and a predetermined hot water treatment step" has a meaning including a process of producing an oolong tea beverage comprising additional steps other than those steps and the additional steps may include steps in a general process of producing the oolong tea beverage or other special steps.

Further, the "eluting and removing about 11 to 26% caffeine from the raw material oolong tea leaves" has the same meaning as that about 11 to 26% of caffeine is eluted in treated water from raw material oolong tea leaves and caffeine is removed to that extent from the raw material oolong tea leaves and such an elution ratio (%) can be calculated as (caffeine amount in the treated water/caffeine amount in raw material oolong tea leaves)×100.

Furthermore, whether an oolong tea beverage is of the invention or not can be determined in such a manner that the nerolidol content in the oolong tea beverage is measured and if the nerolidol content is in a range of 0.42 to 0.65 as a relative ratio by taking the surface of the internal standard substance (5 µl of 0.1% cyclohexanol) as 1 in an SPME method, the oolong tea beverage can be assumed to be of the invention.

Moreover, in this specification, the expression "A to B" means not lower than A and not higher than B unless a particular note is given.

BRIEF DESCRIPTION OF THE DRAWINGS

FIG. 1 is a graph showing the contents of aroma components of the oolong tea beverage obtained by Example 1, Comparative Example 1, and Comparative Example 2, which will be described later.

DESCRIPTION OF THE PREFERABLE EMBODIMENT

Hereinafter, one example of embodiments of the invention will be described, however it is not intended that the invention be limited to the described embodiments.

In this embodiment, after a cold water treatment step of bringing the raw material oolong tea leaves into contact with water and recovering treated tea leaves and treated water, and successively a hot water extraction step of recovering hot-water extract and extracted tea by extracting the recovered treated tea leaves with hot water are carried out, the oolong tea beverage is produced by treating the recovered hot water extract by the same process as the conventional or presently performed process of producing an oolong tea beverage.

Hereinafter, this production process will be described in details.

(Raw Material Oolong Tea Leaves)

Raw material oolong tea leaves are not limited in the type of tea leaves and any oolong tea leaves subjected to rough tea production process can be employed. However, the types of tea leaves such as "tie guan yin" or "huang jin gui" containing a lot of nerolidol are preferably. Or, different types may be used while being blended or tea leaves subjected to finishing process may be used.

Additionally, the raw material oolong tea leaves may be used as they are, and on the other hand, the raw material oolong tea leaves may be used while being made fine by cutting, pulverizing or grinding.

(Cold Water Treatment Step)

In the cold water treatment step, the raw material oolong tea leaves are brought into contact with water adjusted to be at pH about 4 to 6 and about 25° C. or lower for 30 seconds or longer and shorter than 3 minutes and solid-liquid separated to recover treated tea leaves and treated water.

The cold water treatment can elute and remove caffeine, which is a bitter and astringent component, from the raw material oolong tea leaves and wash out foreign matters adhering to the raw material oolong tea leaves.

The raw material oolong tea leaves may be brought into contact with water by, for example, immersing the raw material oolong tea leaves in water. More particularly, extraction treatment so-called kneader extraction may be carried out for washing leaves in such a manner that the raw material oolong tea leaves are filled in a water storage tank of an extraction pot (a kneader), a predetermined amount of water is poured to the tank to immerse the tea leaves for a predetermined time under a condition of stirring the leaves if necessary. Or extraction treatment so-called drip extraction may be carried out for washing leaves in such a manner that the raw material oolong tea leaves are filled in a column and water is successively sent to the column for a predetermined time. Additionally, conventionally or presently employed extraction methods can be employed. The way of bringing tea leaves into contact with water is not particularly limited and may be selected properly depending on the requirements and the purposes.

Also, the solid-liquid separation method is not particularly limited and any conventionally or presently employed solid-liquid separation method following the extraction method may be employed.

Water to be employed in the cold water treatment step (the water to be brought into contact with the raw material oolong tea leaves) includes hard water, soft water, ion exchanged water, natural water or another type of water, and water at not higher than 25° C., particularly about 15 to 25° C., is preferable to use. If it is water at about 15° C. or more, no cooling facility is required to suppress the production cost.

The time for contacting the raw material oolong tea leaves with water is about 30 seconds or longer and shorter than 3 minutes, preferably about 30 seconds or longer and shorter than 1 minute. If treatment time is about 30 seconds or longer and shorter than 3 minutes, the bitter and astringent taste can be suppressed.

Water to be brought into contact with the raw material oolong tea leaves has pH about 6 or lower, preferably about 4 to 6. If the pH is about 6 or lower, preferable sensory test evaluations can be obtained. If the pH is 4 or higher, the addition amount of vitamin C can be suppressed to result in production cost suppression.

The pH adjustment of water can be carried out by using an acidic substance and an alkaline substance in respectively proper amounts in combination. As the acidic substance, vitamin C (ascorbic acid) or the like is preferably used, and as the alkaline substance, sodium hydrogen carbonate or the like is preferably used. However, if it does not cause any adverse effect on the taste, other acidic substances and alkaline substances can be used.

In the cold water treatment step, about 11 to 26% caffeine can be eluted and removed from the raw material oolong tea leaves and this range is preferable for the flavor and taste of the oolong tea beverage, particularly bitter and astringent taste.

Additionally, the treated water may be discharged, or caffeine can be refined for other uses.

(Hot Water Extraction Step)

In the hot water extraction step, the recovered treated tea leaves are extracted with hot water at about 90 to 95° C. for about 10 to 15 minutes and then the resulting hot water extract is recovered by solid-liquid separation.

In such a manner that extraction is carried out with hot water at an extremely high temperature, oolong tea with a high quality, particularly, nerolidol, which is a flower scent component particular in the cultivar "tie guan yin" and the cultivar "huang jin gui", can be extracted much.

Presently employed extraction methods may be used as the extraction method. For examples, extraction may be carried out by so-called kneader extraction in such a manner that the obtained tea leaves are filled in a water storage tank such as an extraction pot (a kneader), a predetermined amount of water is poured to the tank to immerse the tea leaves for a predetermined time under a condition of stirring the leaves if necessary. Or extraction may be carried by so-called drip extraction in such a manner that the treated tea leaves are filled in a column and water is successively sent to the column for a predetermined time. The extraction method is not particularly limited and may optionally and properly be carried out depending on the requirements and the purposes.

The solid-liquid separation is not particularly limited and any conventionally or presently employed solid-liquid separation method following the extraction method may be employed.

The extraction temperature (that is, the temperature of hot water for extraction) and the extraction time are preferably in the above-mentioned ranges, respectively and on the basis of the above-mentioned ranges, they may properly be changed depending on the tea types of the raw material oolong tea leaves, the amount of the raw material oolong tea leaves, and other conditions.

For hot water for the extraction, hard water, soft water, ion-exchanged water, natural water and other kinds of water may be used, and it is preferable to add vitamin C (ascorbic acid) and to adjust pH about 4 to 6. Suppression of pH to about 6 or lower, the effect on water color can be eliminated.

The pH adjustment of the hot water is preferably carried out by adding vitamin C (ascorbic acid) as an acidic substance and using potassium carbonate, sodium hydrogen carbonate, particularly potassium carbonate and sodium hydrogen carbonate in combination as an alkaline substance, thereby the pH at a desired value. These pH adjusters are not only harmless on human body but also increases relish taste (Umami) and if sodium hydrogen carbonate is used, pH can be stabilized. However, if no adverse effect is caused, other alkaline substances may be used.

The hot water extract recovered in the hot water extraction step may be treated similarly to conventionally or presently performed processes for producing an oolong tea beverage. For example, through the filtration step of filtering the hot water extract, a formulation step of adjusting the concentration and the pH of the hot water extract, a sterilization step of heating and sterilizing the formulation solution, and a step of filling the solution in a container, the oolong tea beverage (a drink) possible to be commercialized in markets can be produced. In addition, the order of the respective steps can be changed and elimination and addition of steps are optional.

Hereinafter, the respective steps will be described.

(Cooling and Adjusting Acidity)

The hot water extract recovered in the hot water extraction step is cooled to about 5 to 40° C. as necessary. Simultaneously or before or after that, if necessary, ascorbic acid or sodium ascorbate may be added to the hot water extract to adjust the acidity (pH 4 to 5). Cooling of the hot water extract or adjusting the acidity of the hot water extract is effective to prevent oxidation of the extracted components and at the same time to precipitate the components causing primary sediment, so that the centrifugation in the post step can be improved.

However, the above-mentioned cooling and acidity adjustment of the hot water extract may be eliminated.

(Filtration Step)

In the filtration step, for example, rough filtration for removing extraction residues such as tea leaves and large fine powder is carried out and filtration for removing substances causing primary sediment is carried out. However, it is optional to select between which steps of the production process the rough filtration and filtration for removing the substances causing primary sediment should be inserted. "The primary sediment" means sediment starting precipitation immediately after the beverage production. It is known that the sediment is produced by bonding caffeine, terflavin, and the like.

The rough filtration may be carried out by employing optional filtration method employed presently for removing the extraction residues by flannel, a stainless filter, a strainer or the like.

The filtration method for removing the substances causing the primary sediment may be carried out by centrifugation, kieselguhr filtration, proper membrane filtration, or combinations of two or more of the se filtration methods.

The centrifugation may be carried out at, for example, 5,000 to 10,000 rpm rotation speed and at the time of centrifugation, as described above, the hot water extract or the formulation solution is preferably cooled to about 5 to 40° C.

In the case of carrying out kieselguhr filtration, it is not necessary to insert centrifugation. However, insertion of the centrifugation as pretreatment makes it possible to lessen the load on the kieselguhr filtration, for example, to shorten the filtration time owing to the increase of permeation flow rate.

The membrane filtration includes membrane separation such as fine filtration, microfiltration, ultrafiltration, reverse osmosis membrane filtration, electrodialysis, filtration through biologically functional membrane and it may be combined with the filtration using a filtration assisting agent such as the above-mentioned kieselguhr filtration.

The method and set conditions of the above-mentioned centrifugation, kieselguhr filtration, and membrane filtration may be adjusted optionally.

(Formulation Step)

Similarly to the conventionally or presently performed process of producing the oolong tea beverage, in the formulation step, mainly pH adjustment, concentration adjustment, and taste adjustment may be carried out by adding one or more of water (hard water, soft water, ion-exchanged water, natural water or the like), ascorbic acid, sodium ascorbate, sodium hydrogen carbonate, saccharides, dextrin, flavor, an emulsifier, a stabilizer, and other tasting raw materials.

(Heating Sterilization Step)

In the case of producing a canned beverage, the heating sterilization step is carried out by re-heating as necessary and then filling a can with the formulation solution and heating and sterilizing the solution at 121° C. for 7 minutes by retort sterilization (for example, under properly pressurized condition (1.2 mmHg or so)). In the case of producing the beverage containered in a plastic bottle or a paper drink box, UHT sterilization (keeping the formulation solution at 120 to 150° C. for 1 to several ten seconds) may be carried out.

In addition, depending on the beverage, the sterilization step may be omitted in some cases. For example, in the case of an acidic beverage, the heating and sterilizing step can be omitted. Further, other sterilization methods other than the heating and sterilizing method may be employed.

The raw material oolong tea leaves are brought into contact with water adjusted at pH about 4 to 6 and 25° C. or lower for about 30 seconds or longer and shorter than 3 minutes to remove about 11 to 26% caffeine from the raw material oolong tea leaves by elution and thus properly remove caffeine which is a substance causing bitter and astringent taste from the raw material oolong tea leaves. At the same time, foreign substances adhering to the raw material oolong tea leaves can be removed.

Next, the obtained treated tea leaves may be extracted with hot water at about 90 to 95° C. adjusted at pH about 4 to 6 for 10 to 15 minutes to extract much nerolidol, which is a particular flower scent component of high quality oolong tea. In this case, if extraction is carried out by using hot water containing vitamin C, the solution deterioration in the case of the hot water extraction can be prevented. Further, if pH adjustment is carried out by adding vitamin C, potassium carbonate, and sodium hydrogen carbonate, the relish taste (Umami) of the oolong tea can be increased without affecting the taste.

Accordingly, the oolong tea beverage obtained by the production process of the invention is provided with proper bitter and astringent taste, remaining particular flower scent derived from nerolidol, and enriched flavor and is free from deterioration smell.

The oolong tea beverage obtained by the invention may be used as containered beverage but also as a flavoring raw material by concentrating the hot water extract or as a powdered tea by adding proper additives to the concentrated substance or for a wide variety of drinking food. Further, it may be used as an oolong tea flower scent addition agent for adding the flower scent particular of the oolong tea.

EXAMPLE 1

8 g of raw material oolong tea leaves (a kind of tie guan yin) was immersed in 1,000 mL of cold water adjusted at pH 5 and 20° C. by adding vitamin C (hereinafter, referred to as VC) and sodium hydrogen carbonate while being stirred for 1 minute and then the raw material oolong tea leaves (treated tea leaves) treated by the cold water were recovered. The treated solution used for immersion (treated water) was discharged.

Thereafter, 1,000 mL of hot water at 95° C. and adjusted at pH 6 by adding VC and potassium carbonate was used for extracting the treated tea leaves for 12 minutes to recover hot water extract.

The obtained hot water extract was cooled to 20° C. or lower after rough filtration and mixed with VC and sodium hydrogen carbonate to adjust pH at 6, then adjusted so as to have Brix 0.3 degree, which is the concentration for drinking, filled in a can, and sterilized at 121° C. for 7 minutes to obtain the oolong tea beverage.

COMPARATIVE EXAMPLE 1

Process of Producing General Oolong Tea Beverage 8 g of raw material oolong tea leaves (a kind of tie guan yin) was extracted with 1,000 mL of hot water at 80° C. for 7 minutes.

The obtained hot water extract was cooled to 20° C. or lower after rough filtration and mixed with VC and sodium hydrogen carbonate to adjust pH at 6, then adjusted so as to have Brix 0.3 degree, which is the concentration for drinking, filled in a can, and sterilized at 121° C. for 7 minutes to obtain the oolong tea beverage.

COMPARATIVE EXAMPLE 2

Process of Producing General Oolong Tea Beverage 50 g of raw material oolong tea leaves (a kind of tie guan yin) was loaded into an extraction column of 1,000 mL capacity and 250 g of cold water at 15° C. was passed from the top part of the column to obtain a cold water extract having Brix 6 degree after 30 minutes.

Next, 500 g of hot water at 90° C. was passed through the top part of the column to obtain a hot water extract with Brix 4 degree after 90 minutes.

The hot water extract was adjusted to have Brix 0.3 degree, which is the concentration for drinking, filled in a can, and sterilized at 121° C. for 7 minutes to obtain the oolong tea beverage.

<Comparative Test of Aroma Components>

The oolong tea beverages of Example 1, Comparative Example 1, and Comparative Example 2 were subjected to aroma component quantitative analysis by an SPME method (Solid Phase Micro Extraction) to obtain the results shown in FIG. 1.

The SPME method was carried out as follows: 10 ml of each sample was taken in a vial bottle and the aroma components in the head space were adsorbed in SPME fibers at 60° C. for 30 minutes. For quantitative analysis, 5 µl of 0.1% cyclohexanol as an inner standard was added. The detailed conditions were as follows.

SPME fibers: Suplco Co, DVB/carboxen/PDMS

Apparatus: 5973N GC-MS system manufactured by Agilent Co.,

Column: DB-WAX manufactured by Agilent Co., 60 m×0.25 mm×0.25 µm, 35 to 240° C., 5° C./min.

In the case the value of the Comparative Example 1 was set to be 1, the Comparative Example 2 showed a tendency that the aroma components were decreased as compared with those of Example 1 and Comparative Example 1.

On the other hand, Example 1 showed increase of the aroma components as a whole and particularly nerolidol was remarkably increased.

According to the above-mentioned results, the production process of Example 1 was found proper to extract flavors much and especially extract much nerolidol contained in high quality oolong teas such as "tie guan yin" and "huang jin gui".

<Comparison of Sensory Evaluations>

The oolong tea beverages obtained in Example 1, Comparative Example 1 and Comparative Example 2 were subjected to sensory evaluations and the results are shown collectively in Table 1.

The sensory evaluation was carried out by carrying out a blind test by 10 panelists to evaluate the flavors and the taste.

TABLE 1

| | Flavor | Bitterness and astringency | Comprehensive evaluation |
|---|---|---|---|
| Comparative Example 1 | Slightly strong | Strong | Strong flavor and taste (suitable for a common oolong tea beverage) |
| Example 1 | Strong flower scent | Slightly weak | The flower scent is very strong and refreshing feeling is given (suitable for an oolong tea beverage emphasizing the flavor) |
| Comparative Example 2 | Slightly weak | Considerably strong | Weak flavor and strong bitter and astringent taste |

Comparative Example 1 had the flavor and also strongly bitter and astringent taste, and therefore it seemed to be suitable for general oolong tea beverage production process.

Since high temperature extraction was carried out for a long extraction time, Comparative Example 2 gave slight and different flavor. The taste was strongly bitter and astringent.

On the other hand, Example 1 gave flower scent particular in oolong tea strongly remaining in a mouth and also properly bitter and excellent taste giving refreshing feeling.

<Comparison of Content Components>

The contents of catechin and caffeine (CAF) were measured by an HPLC method and the results were shown in the following Table 2.

The contents of catechin was the total contents of four types of catechins; (−)epicatechin (EC), (−)epigallocatechin (EGC), (−)epicatechin gallate (ECg), and (−)epigallocatechin gallate (EGCg).

—HPLC Condition—
Apparatus: D-7000 manufactured by Hitachi Ltd.
Column: YMC JH-303 (250×4.6 mm I.D.)
Flow rate: 1 ml/min
Injection amount: 20 μl
Gradient: A pump#; acetonitrile 5%, B pump; acetonitrile 50%, 0 to 5 min; 95:5, 5 to 25 min; 90:10, 25 to 42 min; 80:20, 60 min.

TABLE 2

|  | Four types of catechins | CAF |
|---|---|---|
| Comparative Example 1 | 120.67 | 156.77 |
| Example 1 | 91.96 | 123.83 |
| Comparative Example 2 | 164.99 | 174.74 |

As a result, in the case of Comparative Example 2, catechins and caffeine, which are bitter and astringent components, were considerably extracted, proving the correlation with the sensory evaluation results.

On the other hand, in the case of Example 1, the extraction amounts of the catechins and caffeine were properly suppressed and the effects were observed in the flavor and the taste.

<Condition Setting Test for Cold Water Treatment>

The correlations of the conditions of the cold water treatment step with the sensory test and the caffeine elution removal ratio were discussed by changing the conditions of the cold water treatment in Example 1.

8 g of raw material oolong tea leaves (a kind of tie guan yin) was immersed in each 1,000 mL of water independently adjusted at pH 4 to 6.5 and 15 to 30° C. by adding vitamin C and sodium hydrogen carbonate while being stirred for 30 seconds to 3 minutes and then the raw material oolong tea leaves (treated tea leaves) treated by the cold water were recovered. The treated solutions used for immersion (treated waters) were recovered for the analysis of caffeine elution ratio. After that, 1,000 mL of hot water at 95° C. and adjusted at pH 6 by adding VC and potassium carbonate was used for extracting the respective treated tea leaves for 12 minutes to recover hot water extracts.

The each obtained hot water extract was cooled to 20° C. or lower after rough filtration and mixed with VC and sodium hydrogen carbonate to adjust pH at 6, then adjusted so as to have Brix 0.3 degree, which is the concentration for drinking, filled in a can, and sterilized at 121° C. for 7 minutes to obtain each oolong tea beverage. The results of the sensory evaluations of the obtained oolong tea beverages are shown in Table 3.

The sensory evaluation was carried out by carrying out a blind test by 10 panelists to evaluate the flavors and the taste.

The immersed treated water (treated water) was subjected by HPLC analysis and the caffeine elution ratios are shown in Table 4.

The caffeine elution ratio was calculated by (the caffeine amount in the treated water by HPLC measurement/the caffeine amount in raw material oolong tea leaves)×100.

—HPLC Condition—
Apparatus: D-7000 manufactured by Hitachi Ltd.
Column: YMC JH-303 (250×4.6 mm I.D.)
Flow rate: 1 ml/min
Injection amount: 20 μl
Gradient: A pump#; acetonitrile 5%, B pump; acetonitrile 50%, 0 to 5 min; 95:5, 5 to 25 min; 90:10, 25 to 42 min; 80:20, 60 min.

TABLE 3

| Cold water temperature | Cold water pH | Treatment time | Sensory evaluation | Evaluation |
|---|---|---|---|---|
| 15° C. | ph 4.0 | 0.5 min | Strong flavor, properly bitter and astringent, and excellent taste | Excellent |
| | | 1 min | Strong flavor, properly bitter and astringent, and excellent taste | Excellent |
| | | 3 min | Although flavorous, bitter and astringent | Comparatively poor |
| | ph 5.0 | 0.5 min | Strong flavor, properly bitter and astringent, and excellent taste | Excellent |
| | | 1 min | Strong flavor, properly bitter and astringent | Good |
| | | 3 min | Although flavorous, bitter and astringent | Comparatively poor |
| | ph 6.0 | 0.5 min | Although flavorous, bitter and astringent | Comparatively poor |
| | | 1 min | Although flavorous, bitter and astringent | Comparatively poor |
| | | 3 min | Although flavorous, bitter and astringent | Comparatively poor |
| | ph 6.5 | 0.5 min | Weak flavor, bitter and astringent | Poor |
| | | 1 min | Weak flavor, bitter and astringent | Poor |
| | | 3 min | Weak flavor, strongly bitter and astringent | Poor |
| 20° C. | ph 4.0 | 0.5 min | Strong flavor, properly bitter and astringent, and excellent taste | Excellent |
| | | 1 min | Strong flavor, properly bitter and astringent | Good |
| | | 3 min | Although flavorous, bitter and astringent | Comparatively poor |
| | ph 5.0 | 0.5 min | Strong flavor, properly bitter and astringent, and excellent taste | Excellent |
| | | 1 min | Strong flavor, properly bitter and astringent | Good |
| | | 3 min | Although flavorous, bitter and astringent | Comparatively poor |
| | ph 6.0 | 0.5 min | Although flavorous, bitter and astringent | Comparatively poor |
| | | 1 min | Weak flavor but properly bitter and astringent | Comparatively poor |
| | | 3 min | Weak flavor but bitter and astringent | Comparatively poor |
| | ph 6.5 | 0.5 min | Weak flavor, bitter and astringent | Poor |
| | | 1 min | Weak flavor, bitter and astringent | Poor |
| | | 3 min | Weak flavor, strongly bitter and astringent | Poor |
| 25° C. | ph 4.0 | 0.5 min | Strong flavor, properly bitter and astringent | Good |
| | | 1 min | Strong flavor, properly bitter and astringent | Good |
| | | 3 min | Although flavorous, bitter and astringent | Comparatively poor |
| | ph 5.0 | 0.5 min | Flavorous and properly bitter and astringent | Comparatively poor |
| | | 1 min | Flavorous and properly bitter and astringent | Comparatively poor |
| | | 3 min | Although flavorous, bitter and astringent | Comparatively poor |
| | ph 6.0 | 0.5 min | Although flavorous, bitter and astringent | Comparatively poor |
| | | 1 min | Although flavorous, bitter and astringent | Comparatively poor |

TABLE 3-continued

| Cold water temperature | Cold water pH | Treatment time | Sensory evaluation | Evaluation |
|---|---|---|---|---|
| | | 3 min | Weak flavor, bitter and astringent | Poor |
| | ph 6.5 | 0.5 min | Weak flavor, bitter and astringent | Poor |
| | | 1 min | Weak flavor, bitter and astringent | Poor |
| | | 3 min | Weak flavor, strongly bitter and astringent | Poor |
| 30° C. | ph 4.0 | 0.5 min | Weak flavor, bitter and astringent | Poor |
| | | 1 min | Weak flavor, bitter and astringent | Poor |
| | | 3 min | Weak flavor, strongly bitter and astringent | Poor |
| | ph 5.0 | 0.5 min | Weak flavor, bitter and astringent | Poor |
| | | 1 min | Weak flavor, bitter and astringent | Poor |
| | | 3 min | Weak flavor, strongly bitter and astringent | Poor |
| | ph 6.0 | 0.5 min | Weak flavor, bitter and astringent | Poor |
| | | 1 min | Weak flavor, bitter and astringent | Poor |
| | | 3 min | Weak flavor, strongly bitter and astringent | Poor |
| | ph 6.5 | 0.5 min | Weak flavor, bitter and astringent | Poor |
| | | 1 min | Weak flavor, bitter and astringent | Poor |
| | | 3 min | Weak flavor, strongly bitter and astringent | Poor |

TABLE 4

| Cold water temperature | Cold water pH | Treatment time | CAF elution ratio (%) |
|---|---|---|---|
| 15° C. | ph 4.0 | 0.5 min | 10.66 |
| | | 0.5 min | 10.66 |
| | ph 5.0 | 0.5 min | 10.95 |
| | | 1 min | 11.38 |
| | ph 6.0 | 0.5 min | 10.95 |
| | | 1 min | 14.27 |
| 20° C. | ph 4.0 | 0.5 min | 12.80 |
| | | 1 min | 17.30 |
| | ph 5.0 | 0.5 min | 11.70 |
| | | 1 min | 18.52 |
| | ph 6.0 | 0.5 min | 12.52 |
| | | 1 min | 20.20 |
| 25° C. | ph 4.0 | 0.5 min | 16.54 |
| | | 1 min | 19.67 |
| | | 0.5 min | 16.94 |
| | | 1 min | 20.44 |
| | | 0.5 min | 14.67 |
| | | 1 min | 26.20 |

According to the results of the sensory evaluations, the temperature of the treatment water for the cold water treatment was found preferable to be 25° C. or lower. However, it became lower than 15° C., a facility such as a cooling chiller or the like would be required and therefore, taking it into consideration, the temperature is preferable 15 to 25° C.

Further, with respect to the pH of the treatment water for the cold water treatment, it could be understood that pH was preferable to be lower than 6.5 from the sensory evaluations. However, if it was lower than 4.0, the addition amount of VC might be increased to result in cost up and therefore it seems to be preferable that the pH was in a range of 4 to 6.

With respect to the treatment time of the cold water treatment, if it exceeded 3 minutes, the bitter and astringent taste tended to be emphasized, and therefore it seems to be preferable that the time was 30 seconds to shorter than 3 minutes, particularly 30 seconds to 1 minute.

From a viewpoint of the comprehensive evaluation on the basis of the sensory evaluations, it was made clear that in the case where the caffeine elution to the treated water (the caffeine ratio in the treated water) was in a range of 10.66 to 26.20%, i.e., about 11 to 26% elution, the flavor and the taste were found excellent. Particularly, in the case where the caffeine elution to the treated water was in a range of 10.66 to 13.95%, i.e., about 11 to 14% elution, the flavor was particularly strong, proper bitter and astringent taste was given, and the flavor and the taste were found excellent.

<Condition Setting Test for Hot Water Extraction Step>

The correlations of the conditions of the hot water extraction step with the sensory test and the nerolidol extraction ratio were discussed by changing the conditions of the hot water extraction step in Example 1.

8 g of raw material oolong tea leaves (a kind of tie guan yin) was immersed in 1,000 ML of cold water adjusted at pH 4 and 20° C. by adding VC and sodium hydrogen carbonate while being stirred for 1 minute and then the raw material oolong tea leaves (treated tea leaves) treated by the cold water were recovered. The treated solutions used for immersion (treated waters) was discharged.

Thereafter, 1,000 mL of hot water adjusted at 80 to 95° C. and at pH 4 to 6.5 by adding VC and potassium carbonate was used for extracting the respective treated tea leaves for 5 to 20 minutes to recover hot water extracts.

The each obtained hot water extract was cooled to 20° C. or lower after rough filtration and mixed with VC and sodium hydrogen carbonate to adjust pH at 6, then adjusted so as to have Brix 0.3 degree, which is the concentration for drinking, filled in a can, and sterilized at 121° C. for 7 minutes to obtain each oolong tea beverage.

The respectively obtained oolong tea beverages were subjected to the sensory evaluations. The sensory evaluation was carried out by carrying out a blind test by 10 panelists to evaluate the flavors and the taste. The results are shown in Table 5.

The nerolidol content was measured by the above-mentioned SPME method (Solid Phase Micro Extraction method) for the extracts found preferable and obtained in the case where the hot water temperature was 90 and 95° C. and pH 4 to 6. The amount of nerolidol was determined as a relative ratio by taking the surface of the internal standard substance (5 μl of 0.1% cyclohexanol) as 1. The results are shown in Table 6.

TABLE 5

| Hot water temperature | Hot water pH | Treatment time | Sensory evaluation | Evaluation |
|---|---|---|---|---|
| 80° C. | ph 4.0 | 5 min | Weak flavor and taste | Poor |
| | | 10 min | Weak flavor and taste | Poor |
| | | 15 min | Weak flavor, bitter and astringent | Poor |
| | | 20 min | Weak flavor, strongly bitter and astringent | Poor |
| | ph 5.0 | 5 min | Weak flavor and taste | Poor |
| | | 10 min | Weak flavor, bitter and astringent | Poor |

TABLE 5-continued

| Hot water temperature | Hot water pH | Treatment time | Sensory evaluation | Evaluation |
|---|---|---|---|---|
| | | 15 min | Weak flavor, strongly bitter and astringent | Poor |
| | | 20 min | Weak flavor, strongly bitter and astringent | Poor |
| | ph 6.0 | 5 min | Weak flavor and taste | Poor |
| | | 16 min | Weak flavor, bitter and astringent | Poor |
| | | 15 min | Weak flavor, strongly bitter and astringent | Poor |
| | | 20 min | Weak flavor, strongly bitter and astringent | Poor |
| | ph 6.5 | 5 min | Weak flavor and taste | Poor |
| | | 10 min | Weak flavor and strongly bitter and astringent (water color is red) | Poor |
| | | 15 min | Weak flavor and strongly bitter and astringent (water color is red) | Poor |
| | | 20 min | Weak flavor and strongly bitter and astringent (water color is red) | Poor |
| 90° C. | ph 4.0 | 5 min | Weak flavor and taste | Poor |
| | | 10 min | Although flavorous, bitter and astringent | Comparatively poor |
| | | 15 min | Strong flavor, properly bitter and astringent | Good |
| | | 20 min | Flavorous, but strongly bitter and astringent | Poor |
| | ph 5.0 | 5 min | Weak flavor and taste | Poor |
| | | 10 min | Strong flavor, properly bitter and astringent | Good |
| | | 15 min | Although flavorous, bitter and astringent | Comparatively poor |
| | | 20 min | Flavorous, but strongly bitter and astringent | Poor |
| | ph 6.0 | 5 min | Weak flavor and taste | Poor |
| | | 10 min | Although flavorous, bitter and astringent | Comparatively poor |
| | | 15 min | Strong flavor, properly bitter and astringent | Good |
| | | 20 min | Flavorous, but strongly bitter and astringent | Poor |
| | ph 6.5 | 5 min | Weak flavor and taste | Poor |
| | | 10 min | Weak flavor and strongly bitter and astringent (water color is red) | Poor |
| | | 15 min | Weak flavor and strongly bitter and astringent (water color is red) | Poor |
| | | 20 min | Weak flavor and strongly bitter and astringent (water color is red) | Poor |
| 95° C. | ph 4.0 | 5 min | Weak flavor and taste | Poor |
| | | 10 min | Although flavorous, bitter and astringent | Comparatively poor |
| | | 15 min | Strong flavor, properly bitter and astringent | Good |
| | | 20 min | Flavorous, but strongly bitter and astringent | Poor |
| | ph 5.0 | 5 min | Weak flavor and taste | Poor |
| | | 10 min | Strong flavor, properly bitter and astringent | Good |
| | | 15 min | Although flavorous, bitter and astringent | Comparatively poor |
| | | 20 min | Flavorous, but strongly bitter and astringent | Poor |
| | ph 6.0 | 5 min | Although flavorous, bitter and astringent | Comparatively poor |
| | | 10 min | Although flavorous, bitter and astringent | Comparatively poor |
| | | 15 min | Strong flavor, properly bitter and astringent | Good |
| | | 20 min | Weak flavor and strongly bitter and astringent (water color is red) | Poor |
| | ph 6.5 | 5 min | Weak flavor and taste | Poor |
| | | 10 min | Weak flavor and strongly bitter and astringent (water color is red) | Poor |
| | | 15 min | Weak flavor and strongly bitter and astringent (water color is red) | Poor |
| | | 20 min | Weak flavor and strongly bitter and astringent (water color is red) | Poor |

TABLE 6

| Hot water temperature | Hot water pH | Treatment time | Nerolidol |
|---|---|---|---|
| 90° C. | ph 4.0 | 5 min | 0.27 |
| | | 10 min | 0.43 |
| | | 15 min | 0.62 |
| | | 20 min | 0.47 |
| | ph 5.0 | 5 min | 0.29 |
| | | 10 min | 0.65 |
| | | 15 min | 0.51 |
| | | 20 min | 0.41 |
| | ph 6.0 | 5 min | 0.33 |
| | | 10 min | 0.42 |
| | | 15 min | 0.62 |
| | | 20 min | 0.46 |
| 95° C. | ph 4.0 | 5 min | 0.31 |
| | | 10 min | 0.53 |
| | | 15 min | 0.56 |
| | | 20 min | 0.51 |
| | ph 5.0 | 5 min | 0.38 |
| | | 10 min | 0.60 |
| | | 15 min | 0.52 |
| | | 20 min | 0.48 |
| | ph 6.0 | 5 min | 0.43 |
| | | 10 min | 0.50 |
| | | 15 min | 0.65 |
| | | 20 min | 0.54 |

According to the sensory evaluations, the amount of nerolidol in the oolong tea beverages were found to be preferable in a range of 0.42 to 0.65 as a relative ratio by taking the surface of the internal standard substance (5 μl of 0.1% cyclohexanol) as 1, and particularly in the case where they were in a range of 0.56 to 0.65, both of the flavor and the taste were found excellent.

On the other hand, if the hot water extraction conditions were adjusted so as to keep the nerolidol amount in the oolong tea beverage within the range, the oolong tea beverage containing a large quantity of flower scent of particularly nerolidol can be obtained without deteriorating the flavor and the taste.

That is, it was found desirable that the hot water extract was adjusted to be at pH 4 to 6; the extraction temperature at 90 to 95° C., and the extraction time for 10 to 15 minutes.

What is claimed is:

1. A process of producing an oolong tea beverage, comprising:
    a cold water treatment step of bringing raw material oolong tea leaves into contact with water adjusted at pH about 4 to 6 and 25° C. or lower for about 30 seconds or longer and shorter than 3 minutes, eluting and removing about 11 to 26% caffeine from the raw material oolong tea leaves by carrying out solid-liquid separation, and recovering the treated tea leaves; and a hot water extraction step of recovering hot water extract to be a beverage raw material containing nerolidol by extracting the treated tea leaves for about 10 minutes to 15 minutes with hot water at about 90 to 95° C. containing vitamin C and adjusted at pH about 4 to 6 and then carrying out solid-liquid separation.

2. The process of producing an oolong tea beverage according to claim 1, further comprising:

a filtration step of filtering the hot water extract recovered in the hot water extraction step;

a formulation step of adjusting the concentration and the pH of the filtered hot water extract;

a sterilization step of heating sterilization processing of the formulation solution obtained by the formulation step; and a step of filling the solution in a container.

3. The process of producing an oolong tea beverage according to claim 2, wherein, after the hot water extract recovered in the hot water extraction step is roughly filtered, the hot water extract obtained by the rough filtration is cooled to 20° C. or lower and is adjusted to be at pH7 or lower and then adjusted to have a concentration for drinking in the formulation step.

4. The process of producing an oolong tea beverage according to claim 1, wherein the raw material oolong tea leaves are of the cultivar "tie guan yin", the cultivar "huang jin gui", or mixture of them.

5. The process of producing an oolong tea beverage according to claim 1, wherein the method for bringing the raw material oolong tea leaves into contact with water in the cold water treatment step is a method by immersing the raw material oolong tea leaves in water in a water storage tank for a predetermined time under a stirring condition.

6. The process of producing an oolong tea beverage according to claim 1, wherein the method for bringing the raw material oolong tea leaves into contact with water in the cold water treatment step is a method by passing water through a column filled with the raw material oolong tea leaves for a predetermined time.

7. The process of producing an oolong tea beverage according to claim 1, wherein the water to be used in the cold water treatment step is at about 15 to 25° C.

8. The process of producing an oolong tea beverage according to claim 1, wherein the pH adjustment of the water in the cold water treatment step is carried out by using vitamin C, sodium hydrogen carbonate, or combination of these two compounds.

9. The process of producing an oolong tea beverage according to claim 1, wherein the method for extracting the treated tea leaves with hot water in the hot water extraction step is a method by immersing the treated tea leaves in water in a water storage tank for a predetermined time under a stirring condition.

10. The process of producing an oolong tea beverage according to claim 1, wherein the method for extracting the treated tea leaves with hot water in the hot water extraction step is a method by passing water through a column filled with the treated tea leaves for a predetermined time.

11. The process of producing an oolong tea beverage according to claim 1, wherein the pH adjustment of the hot water in the hot water extraction step is carried out by using vitamin C and either one or both of potassium carbonate and sodium hydrogen carbonate.

12. The process of producing an oolong tea beverage according to claim 1, adjusting the parameters such that the amount of nerolidol in the oolong tea beverage is in a range of 0.42 to 0.65 as a relative ratio by taking the surface of the internal standard substance (5 μm of 0.1% cyclohexanol) as 1 in an SPME method.

* * * * *